US008474684B2

(12) United States Patent  
Sommer et al.

(10) Patent No.: US 8,474,684 B2  
(45) Date of Patent: Jul. 2, 2013

(54) SEGMENTED MANDREL FOR HIGH TEMPERATURE BONDING OF METALLIC AXISYMMETRIC SHELLS HAVING COMPLEX CURVATURES

(75) Inventors: Thomas Edward Sommer, San Diego, CA (US); Mark Alan Ramsey, Chula Vista, CA (US); David Dwain Rishel, Smithville, TX (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 13/548,406

(22) Filed: Jul. 13, 2012

(65) Prior Publication Data

US 2013/0133820 A1  May 30, 2013

Related U.S. Application Data (62) Division of application No. 12/029,170, filed on Feb. 11, 2008, now Pat. No. 8,245,750.

(51) Int. Cl.  
*B23K 28/00* (2006.01)

(52) U.S. Cl.  
USPC ........... 228/193; 228/194; 228/195; 228/196; 156/213; 156/215; 156/218; 264/241; 264/264; 264/267; 264/271.1; 264/294; 264/320; 264/327; 264/516

(58) Field of Classification Search  
USPC ............. 156/173, 213, 215, 218, 443, 425, 156/442, 457; 425/436 R, 441, 443, 469, 425/470, 502; 264/516, 241, 264, 267, 271.1, 264/294, 320, 327; 228/193–196  
See application file for complete search history.

(56) References Cited

U.S. PATENT DOCUMENTS

| 3,184,362 A | 5/1965 | Litsky |
| 3,633,267 A | 1/1972 | Deminet et al. |
| 4,231,507 A * | 11/1980 | Quinby ................... 228/131 |
| 4,355,664 A | 10/1982 | Cook |
| 4,421,589 A | 12/1983 | Armini et al. |
| 4,429,824 A | 2/1984 | Woodward |
| 4,448,628 A | 5/1984 | Stott |
| 4,754,911 A | 7/1988 | Turner |

(Continued)

FOREIGN PATENT DOCUMENTS

| EP | 0653256 | 5/1995 |
| JP | 07 185696 | 7/1995 |
| JP | 2005177846 | 7/2005 |

OTHER PUBLICATIONS

European Search Report dated Sep. 3, 2009 issued in EP Counterpart Application (No. 09001840.9).

*Primary Examiner* — Christopher Schatz  
(74) *Attorney, Agent, or Firm* — Snell & Wilmer L.L.P.

(57) ABSTRACT

A method for bonding a composite multi-layer shell having complex curvature by the delta-alpha high temperature bonding process uses a novel tool. The tool includes a plurality of segments that combine to form a mandrel assembly having a substantially continuous outer surface. The outer surface has a substantially axisymmetric shape including a complex curvature. When the segments are combined to form the mandrel assembly, at least one of the segments is configured to be movable in a substantially inward direction without substantial obstruction by any other segment. The segments are constructed of a first material have a first coefficient of thermal expansion that is greater than a second coefficient of thermal expansion of a second material of a composite multi-layer shell to be bonded together using the tool.

20 Claims, 11 Drawing Sheets

U.S. PATENT DOCUMENTS

| | | |
|---|---|---|
| 4,889,276 A | 12/1989 | Cadwell et al. |
| 4,984,732 A | 1/1991 | Hudson |
| 5,040,946 A | 8/1991 | Caoduro |
| 5,097,689 A | 3/1992 | Pietrobon |
| 5,145,629 A * | 9/1992 | Nilsson .................. 264/292 |
| 5,193,737 A | 3/1993 | Carraher |
| 5,199,631 A | 4/1993 | Anderson et al. |
| 5,214,948 A | 6/1993 | Sanders et al. |
| 5,266,137 A | 11/1993 | Hollingsworth |
| 5,592,288 A | 1/1997 | Sampica et al. |
| 6,113,718 A | 9/2000 | Yamada et al. |
| 6,755,280 B2 | 6/2004 | Porte et al. |
| 7,049,548 B1 | 5/2006 | Sjogren et al. |
| 2004/0065775 A1 | 4/2004 | Buge et al. |
| 2007/0062022 A1 | 3/2007 | Douglas et al. |

* cited by examiner

SEGMENTED MANDREL FOR HIGH TEMPERATURE BONDING OF METALLIC AXISYMMETRIC SHELLS HAVING COMPLEX CURVATURES

RELATED APPLICATIONS

This is a divisional of U.S. patent application Ser. No. 12/029,170, filed Feb. 11, 2008, now U.S. Pat. No. 8,245,750, whose contents are incorporated by reference in their entirety.

FIELD OF THE INVENTION

The invention generally relates to tools and equipment for high temperature bonding of complex metallic structures, and more particularly relates to a segmented mandrel for use in bonding metallic components together by the delta-alpha high temperature bonding process to form an axisymmetric shell structure having complex curvatures, and a method of using such a mandrel.

BACKGROUND

The delta-alpha high temperature bonding process (also sometimes referred to as the "delta-alpha diffusion bonding process") can be used to bond metallic component layers of hollow axisymmetric structures for use in modern aircraft. Such structures can include an open cell or "honeycomb" metallic core and a metallic face sheet covering each opposed face of the core, for example. The high temperature bonding process generally includes compressing two or more layered metal components together at an elevated temperature with a bonding alloy disposed between the layered components. The process results in fused joints between the components that secure the layered components together.

The delta-alpha high temperature bonding process has been developed to provide a method of compressing layered shell components together as the layers are heated to a bonding temperature. The term "delta-alpha" refers to a difference (commonly designated by the Greek character delta "Δ") in coefficients of thermal expansion (or alpha "a"). Such a process is known for bonding axially-symmetric metallic structures, such as multi-layered cylindrical or conical shells. One embodiment of the delta-alpha high temperature bonding process is generally described in U.S. Pat. No. 4,429,824, assigned to Rohr, Inc., for example.

To bond a composite shell having a simple cylindrical or simple conical shape using the delta-alpha high temperature bonding process, layered metallic components to be bonded (such as sheets of titanium honeycomb material, titanium face sheets, for example) can be positioned around a one-piece inner mandrel constructed of a material having a relatively high coefficient of thermal expansion. The outer surface of the inner mandrel is configured to substantially conform to the final shape of the inside of the cylindrical or conical shape of the composite shell. A layer of a suitable bonding alloy is disposed between the layered metallic components at locations where the components are to be bonded together. As the layered components and mandrel are heated to an elevated temperature, the difference between coefficients of thermal expansion of the layered components and the mandrel causes the inner mandrel to thermally expand more than the layered components. As a result, the expanded mandrel circumferentially stretches and radially presses on the layered shell components, thus compressing the layered components together. When the metal components are compressed together and heated to a sufficiently high temperature for a sufficient time, the bonding alloy fuses the compressed layers together. As the layered components and mandrel cool, the mandrel contracts in size, and the one-piece inner mandrel can be extracted from one end of the bonded shell, thereby releasing the bonded shell from the mandrel. The inside of the resulting bonded multi-layer shell corresponds in shape to the cylindrical or conical shape of the outer surface of the one-piece mandrel.

Though the delta-alpha bonding process described above can be used to bond multi-layer shells having relatively simple cylindrical or conical shapes, forming axisymmetric composite shells having complex curvatures by the delta-alpha bonding process presents special challenges. As used herein, the term "complex curvature" means having one or more concave and/or convex curvatures, wherein at least one intermediate diameter of the shell is either larger or smaller than both diameters at the ends of the shell. As described above, after bonding a cylindrical or conical shell, the cylindrical or conical shape of the one-piece inner mandrel and the bonded shell permit the inner mandrel to be extracted from at least one open end of the shell. For shells having non-cylindrical and non-conical complex shapes and substantial convex and or concave curvatures, however, the inner mandrel would become entrapped within the bonded shell structure such that a one-piece mandrel could not be extracted from an open end of the shell. One solution to this problem is to produce the shell in two or more generally conical or generally cylindrical sections using the bonding process described above, and then joining the sections together end-to-end to form a complete shell. Such a multi-section composite shell typically includes at least one intermediate girth seam around the shell's circumference.

Figure 1:
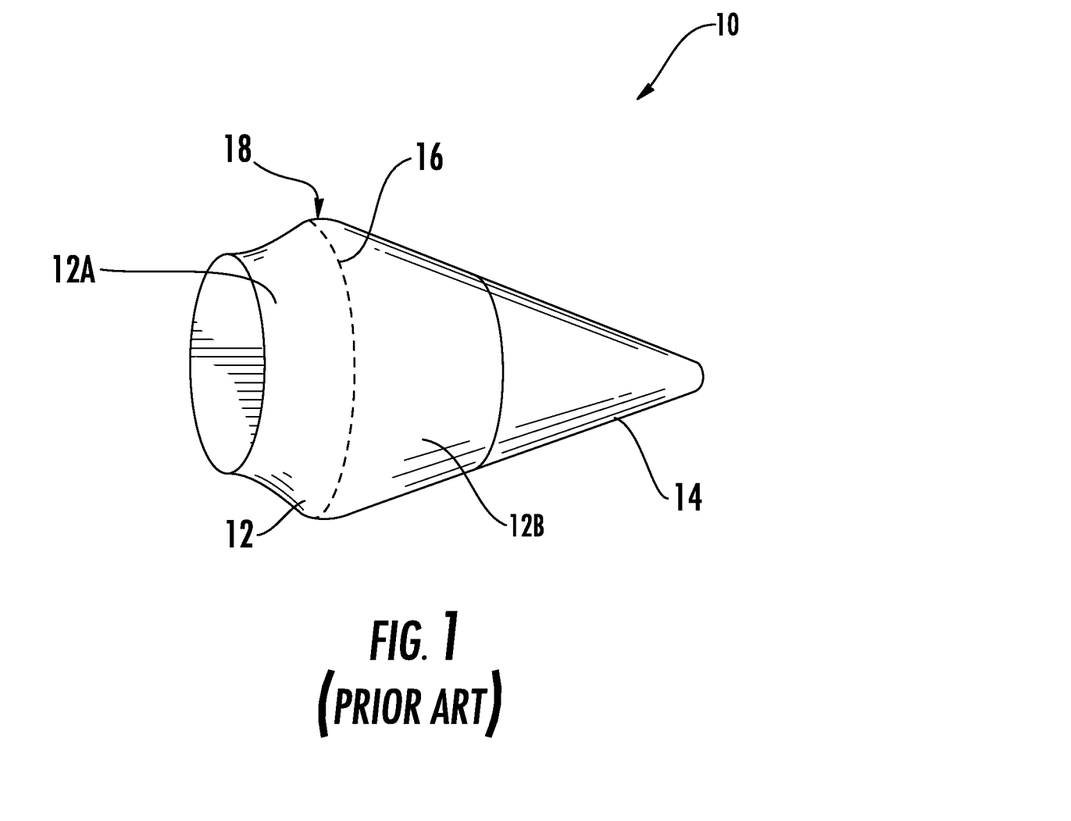
FIG. 1 is an elevation view of typical exhaust center plug for a modern aircraft engine.

Composite shells like those described above can be used as components of modern aircraft engines. For example, such a composite shell can form at least a portion of an engine's exhaust center plug. FIG. 1 shows one example of a typical engine exhaust center plug 10. The center plug 10 includes a center body shell 12 and a tail cone 14. The center body shell 12 is joined to the tail cone 14 along a circumferential girth seam 16. The center body shell 12 has a complex curvature with a maximum diameter at highlight 18 that is larger than the diameter at either end of the shell 12. As discussed above, existing methods of bonding a composite shell having complex curvatures using the delta-alpha bonding process dictate that the center body shell 12 must be constructed in at least two longitudinal sections, including a forward shell portion 12A, and an aft shell portion 12B. The substantially conical geometry of the forward shell portion 12A permits an inner mandrel portion of corresponding shape used during the delta-alpha bonding process to be extracted from an aft end of the shell portion 12A. Similarly, the substantially conical geometry of the aft shell portion 12B permits an inner mandrel portion of corresponding shape used during the delta-alpha bonding process to be extracted from a forward end of the aft shell portion 12B. The forward and aft shell portions 12A, 12B can then be joined along a girth seam 16 as indicated in FIG. 1 by a dashed line. The shell portions 12A, 12B then can be joined together along the girth seam 16 using connecting hardware and/or welds in a manner known in the art.

Unfortunately, a multi-piece shell 12 like that described above has several disadvantages. First, when connecting hardware is used to join the shell segments 12A, 12B, the number of parts required to construct the shell is not minimized. In addition, the connecting hardware adds weight to the shell assembly 12, and extends the time and cost required to produce the shell 12. Furthermore, welding the segments 12A, 12B together along the girth seam 16 adds both cost and time to the production of the shell 12. Thus, producing two segments 12A and 12B and then joining the segments 12A, 12B together adds to the overall time and cost required to produce the shell 12. Accordingly, there is a need for a method of producing a composite shell having complex curvatures in a single piece, thereby eliminating the need for connecting hardware or girth seam welds, minimizing the overall weight of the resulting axisymmetric structure, reducing the number of parts, and reducing the production time required to produce such axisymmetric composite structures having complex curvatures.

SUMMARY

In one embodiment, the invention includes a tool for use in bonding a multi-layer composite shell having complex curvature by the delta-alpha high temperature bonding process. The tool can include a plurality of segments that combine to form a mandrel assembly having a longitudinal axis, a lower end, an upper end, and at least one substantially continuous outer surface. The outer surface has a substantially axisymmetric shape including a complex curvature. When the segments are combined to form the mandrel assembly, at least one of the segments is configured to be movable in a substantially inward direction without substantial obstruction by any other segment.

In one embodiment, a segmented mandrel for use in bonding a composite shell by high temperature bonding includes a first segment, a second segment, and a third segment. The first, second, and third segments combine to form at least a portion of a mandrel assembly, such that when the segments are assembled together in substantially edge-to-edge relation and the third segment is disposed between the first and second segments, the first and third segments define a first joint, and the second and third segments define a second joint. The mandrel assembly forms at least a portion of a substantially axisymmetric body having a longitudinal axis, a lower end, an upper end, and at least one substantially continuous outer surface having complex curvature. When the first, second, and third segments are assembled together to form the mandrel assembly, the third segment is configured to be movable in a substantially inward direction without substantial obstruction by either the first or second segments.

The invention also includes a method of bonding a plurality of layered component materials to form an axisymmetric composite shell by high temperature bonding, the composite shell including an exterior surface and an interior surface having complex curvature. In one embodiment, the method includes assembling the layered component materials to form an unbonded shell assembly. The component materials have a first coefficient of thermal expansion. A segmented inner mandrel is assembled within the unbonded shell assembly. The inner mandrel can include a plurality of segments each having a second coefficient of thermal expansion that is less than the first coefficient of thermal expansion. The inner mandrel can include at least one substantially continuous outer surface that substantially corresponds in shape to at least a portion of the interior surface of the composite shell. The inner mandrel and the assembled component materials are heated to an elevated temperature, thereby substantially compressing the layered component materials together. The segments of the inner mandrel are moved away from the shell to separate the shell from the inner mandrel.

These and other aspects of the invention will be apparent from a reading of the following detailed description together with the drawings.

DETAILED DESCRIPTION

Figure 3A:
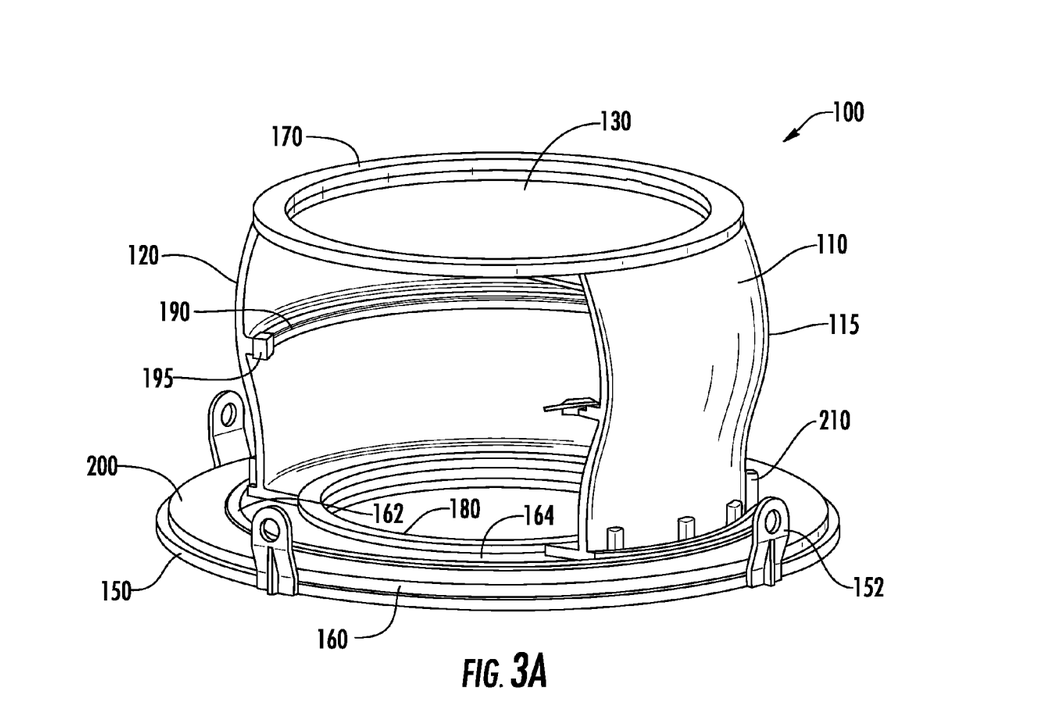
FIG. 3A is a perspective view of a segmented mandrel assembly with one mandrel segment removed in order to show details of interior portions of the mandrel.
Figure 3B:
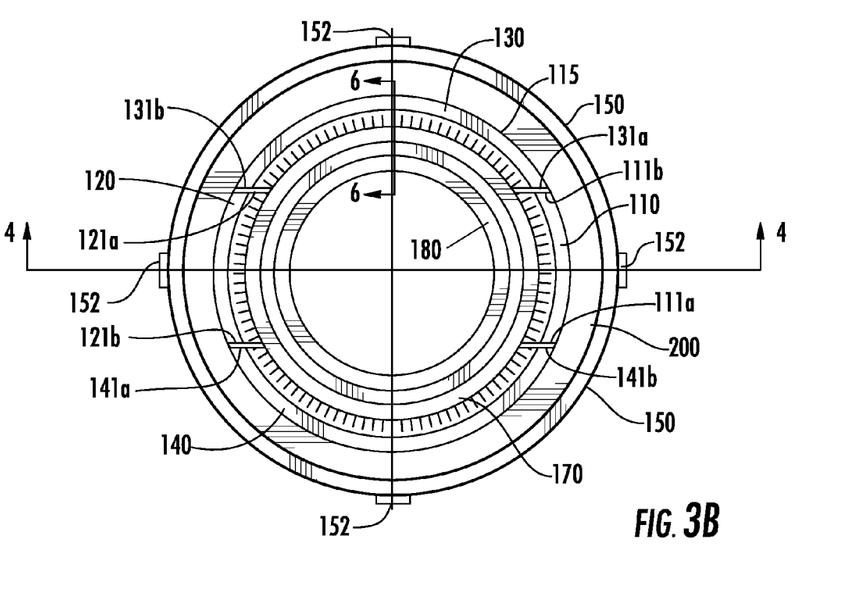
FIG. 3B is a top plan view of the segmented mandrel assembly shown in FIG. 3A showing all mandrel segments assembled together.

One embodiment of a segmented inner mandrel assembly 100 for use in bonding various metallic component materials together to bond a composite shell using the delta-alpha high temperature bonding process is shown in FIGS. 3A and 3B. In the embodiment shown, the inner mandrel assembly 100 includes a plurality of mandrel segments 110, 120 and 130. A fourth mandrel segment (large mandrel segment 140 shown in FIG. 3B) is removed in FIG. 3A in order to reveal various details of interior portions of the inner mandrel assembly 100. In the embodiment shown in FIG. 3A, the absent mandrel segment 140 is a mirror image of mandrel segment 130.

As shown in FIGS. 3A and 3B, the inner mandrel assembly 100 can include a first small mandrel segment 110, and an opposed second small mandrel segment 120. In the embodiment shown, the small mandrel segments 110, 120 are mirror images of each other. As shown in FIG. 3B, a first small mandrel segment 110 is positioned in edge-to-edge relationship between respective edges 131*a*, 141*b* of the large mandrel segments 130, 140. As also shown in FIG. 3B, a second small mandrel segment 120 is positioned in edge-to-edge relationship between the other respective edges 131*b*, 141*a* of the two large mandrel segments 130, 140. As shown in FIG. 3B, the adjacent planar edges 111*a* and 141*b*, 111*b* and 131*a*, 121*a* and 131*b*, and 121*b* and 141*a* of the mandrel segments 110, 120, 130 and 140 can be substantially planar, and substantially parallel to each other over substantially their entire lengths. Preferably, the respective edges 111*a*, 111*b*, 121*a*, 121b, 131a, 131b, 141a and 141b of the mandrel segments 110, 120, 130 and 140 are substantially planar, and the gaps between adjacent edges are minimized in order to provide the inner mandrel assembly 100 with a substantially continuous outer surface 115 around its circumference. For example, the circumferential gaps between adjacent mandrel segments can be not greater than about 0.005 inch at room temperature.

Figure 4:
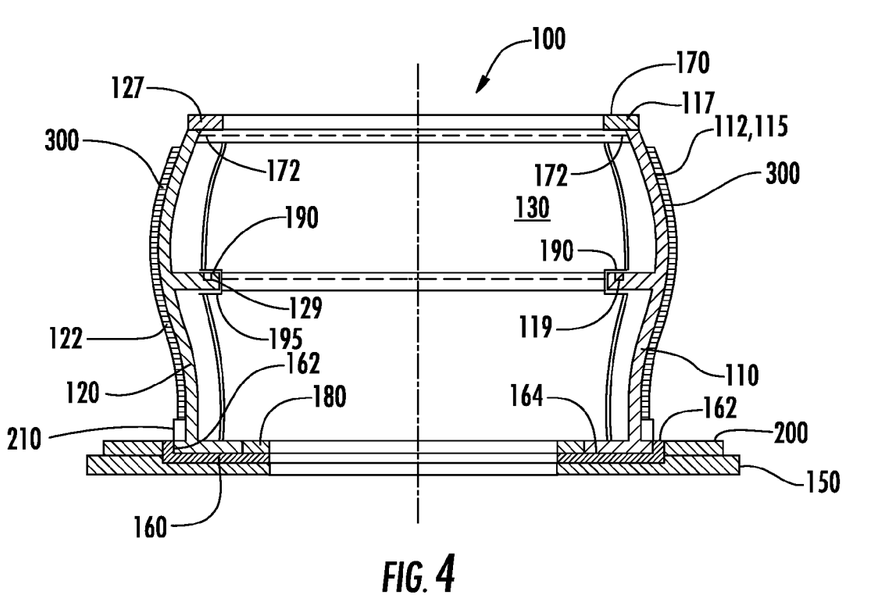
FIG. 4 is a cross section elevation view of the assembled segmented mandrel shown in FIGS. 3A-3B showing a composite shell on the mandrel.

The mandrel assembly 100 shown in FIG. 3A also includes a lifting ring 150, a base plate 160, an upper locking ring 170, and a lower locking ring 180. FIG. 3A also shows a locking key 190, and a plurality of C-shaped locking clips 195. The locking key 190 can be formed as a single circular piece, or can include a plurality of semi-circular segments. As further described below, the upper locking ring 170, lower locking ring 180, locking key 190, and clips 195 work in combination to secure the mandrel segments 110, 120, 130 and 140 in relation to one another in the assembled inner mandrel 100 to form the substantially continuous outer surface 115. As shown in FIGS. 3A and 4, a plurality of station locators 210 can be intermittently positioned around lower peripheral portions of the mandrel segments 110, 120, 130 and 140. As further described below, the station locators 210 provide at least partial vertical support to a composite shell positioned on the inner mandrel assembly 100 during bonding. As shown in FIGS. 3A-3B, the lifting ring 150 can include a plurality of spaced lifting lugs 152 for lifting and moving the lifting ring 150 or the mandrel assembly 100.

Figure 6:
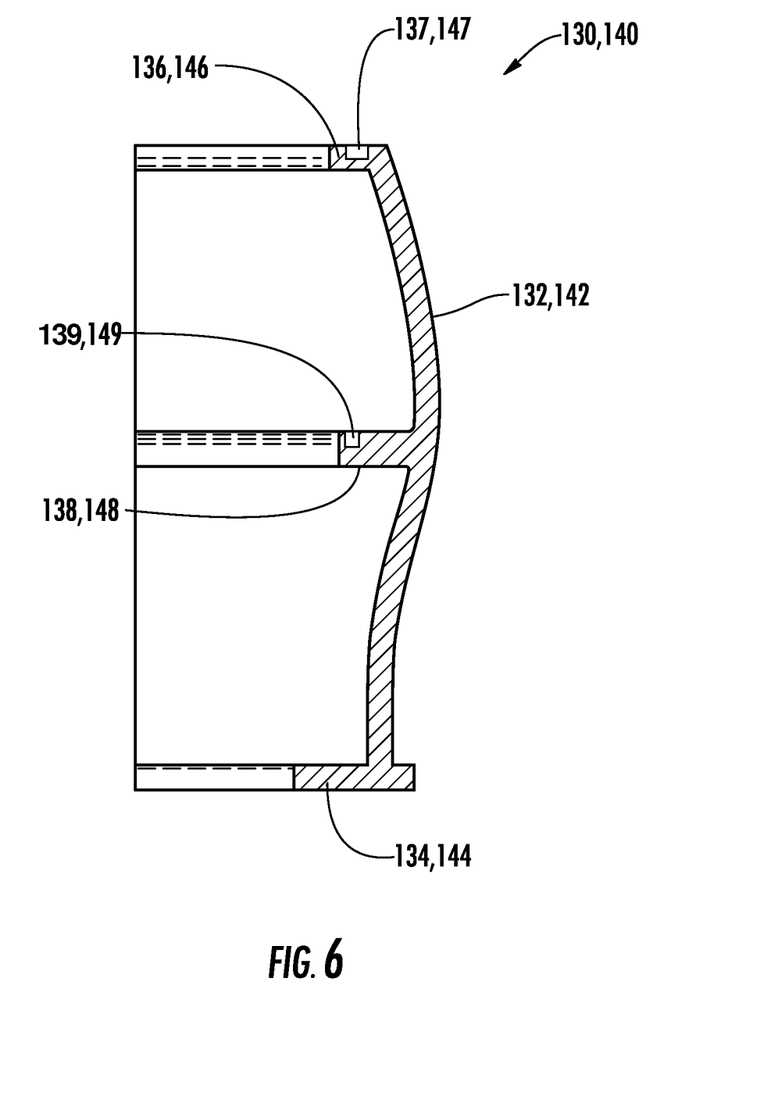
FIG. 6 is a cross-sectional elevation view of a large mandrel segment shown in FIGS. 3A-5 taken along line 6-6 in FIG. 3B.
Figure 7:
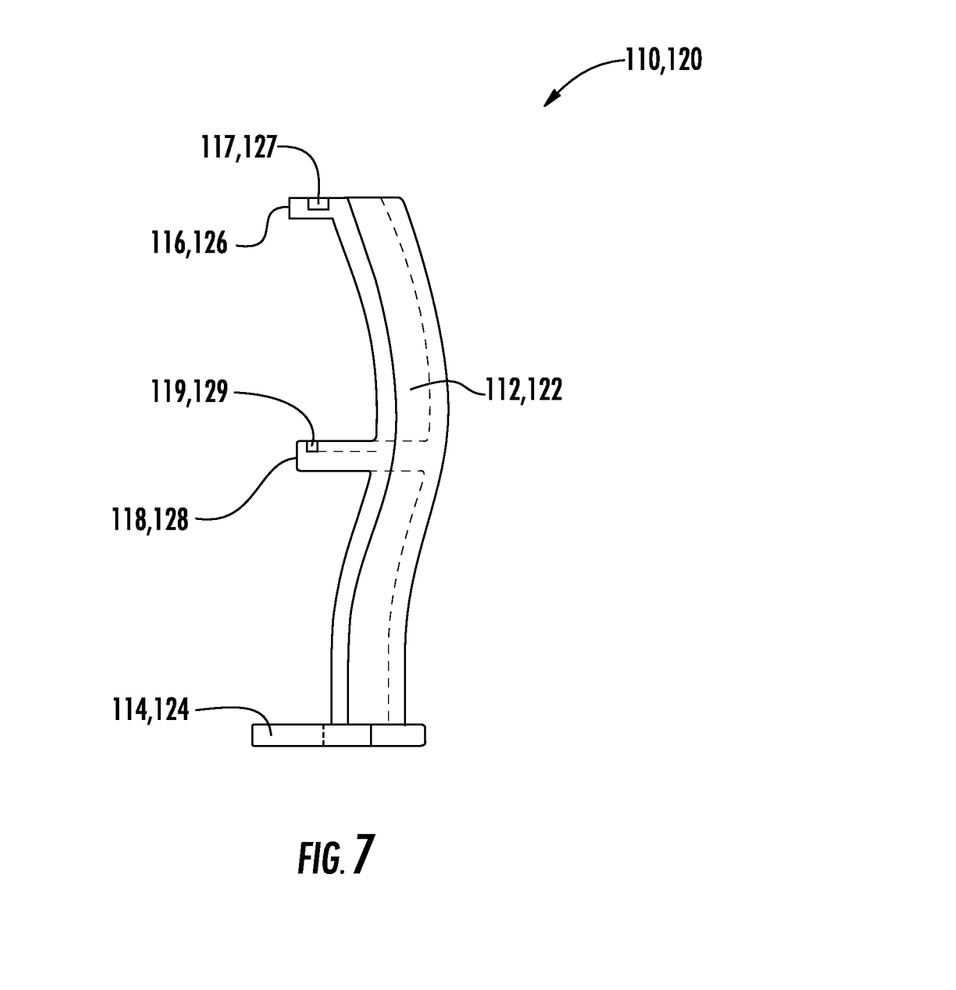
FIG. 7 is side elevation view of a small mandrel segment portion of the segmented mandrel assembly shown in FIGS. 3A-5.

One embodiment of the two small mandrel segments 110, 120 for use in the mandrel assembly 100 shown in FIGS. 3A and 4 is shown in FIG. 7. In this embodiment, the two small mandrel segments 110, 120 are substantially identical, and are interchangeable with each other. Like the large mandrel segments 130, 140 described above and shown in FIG. 6, the small mandrel segments 110, 120 shown in FIG. 7 each include a contoured outer surface 112, 122 having a complex curvature that corresponds in shape to a portion of an interior surface of a shell to be produced using the inner mandrel assembly 100. As shown in FIG. 7, the small mandrel segments 110, 120 further include a bottom flange 114, 124 and a top flange 116, 126. The top flange 116, 126 includes a top circular groove 117, 127. The small mandrel segments 110, 120 can each also include an inside rib 118, 128 having a semi-circular groove 119, 129 therealong. As can be seen by comparing FIG. 6 and FIG. 7, the small mandrel segments 110, 120 and large mandrel segments 130, 140 can have substantially identical cross-sectional profiles. The mandrel segments 110, 120, 130 and 140 are constructed of one or more materials having a first coefficient of thermal expansion. For example, the mandrel segments 110, 120, 130 and 140 each can be constructed of creep-resistant stainless steel, or the like, having a first coefficient of thermal expansion.

Figure 9:
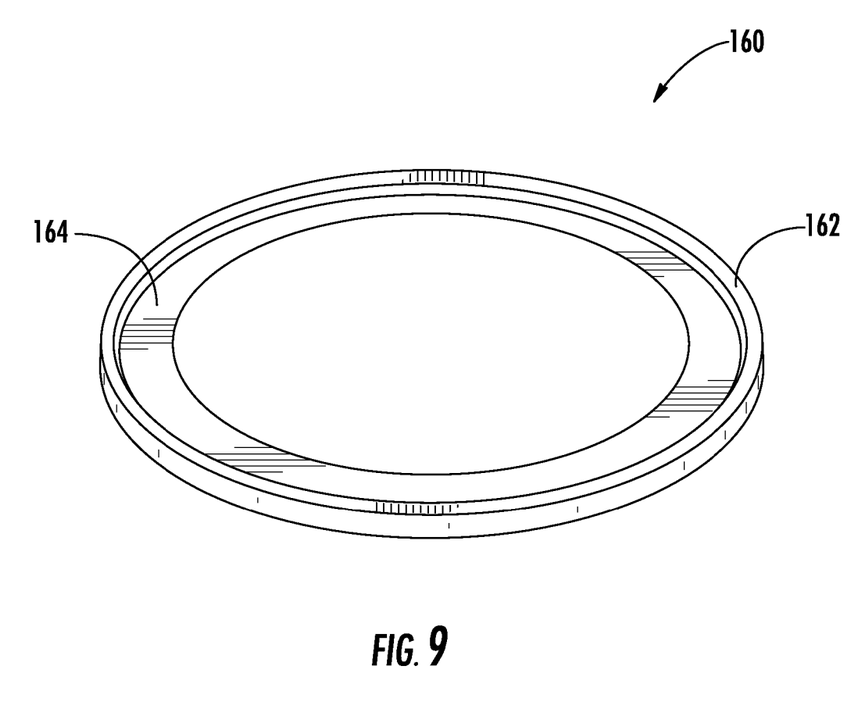
FIG. 9 is a perspective view of a base plate portion of the segmented mandrel shown in FIGS. 3A-5.

As shown in FIGS. 3A and 4, the two small mandrel segments 110, 120 and the two large mandrel segments 130, 140 sit atop the base plate 160. As shown in FIGS. 4 and 9, the base plate 160 can include an upstanding circular lip 162, and a substantially planar upper support surface 164. As shown in FIGS. 3A and 4, the upper support surface 164 of the base plate 160 is configured to vertically support and locate the bottom flanges 114, 124, 134, and 144 of the mandrel segments 110, 120, 130 and 140, and the circular lip 162 is configured to establish a circular datum for radially aligning the bottom flanges of the mandrel segments 110, 120, 130 and 140 with each other. Before the mandrel 100 is assembled, the external surfaces of the mandrel segments 110, 120, 130 and 140 can be coated with a release agent to prevent unwanted bonding between the mandrel segments and the part being bonded using the mandrel segments. During assembly of the segmented inner mandrel assembly 100, the two large mandrel segments 130, 140 are first positioned on opposite sides of the base plate 160. The small mandrel segments 110, 120 then can be inserted between the two large mandrel segments 130, 140. As shown in FIG. 3B, the respective vertical sides 111a, 111b, 121a, 121b, 131a, 131b, 141a and 141b of the mandrel segments 110, 120, 130 and 140 can be substantially planar and substantially parallel to each other. As described in further detail below, this arrangement permits the small mandrel segments 110, 120 to be moved radially inward and/or radially outward without obstruction by the large mandrel segments 130, 140. Preferably, the gaps between the planar edges of the mandrel segments 110, 120, 130 and 140 are minimized to provide the mandrel assembly with a substantially continuous contoured outer surface 115. For example, the circumferential gaps between adjacent mandrel segments can be about 0.005 inch at room temperature.

Figure 10:
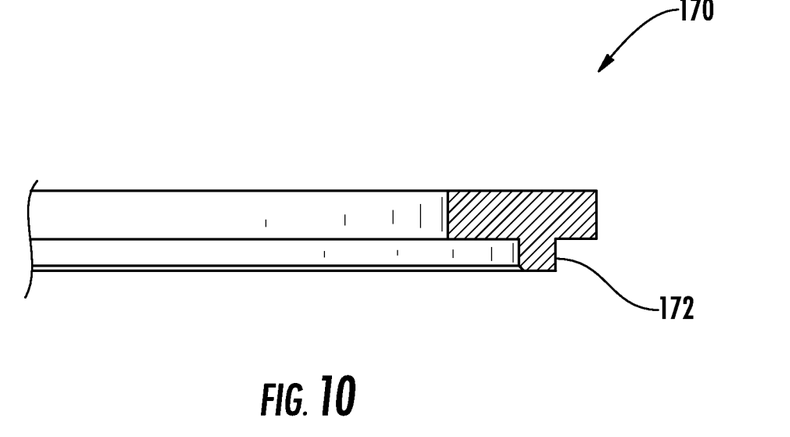
FIG. 10 is a partial cross-sectional view of the upper locking ring shown in FIGS. 3A-3B.

As shown in FIGS. 3A and 4, the mandrel segments 110, 120, 130 and 140 are secured together by an upper locking ring 170, a locking key 190 and locking clips 195, and a lower locking ring 180. A cross-section of one embodiment of an upper locking ring 170 is shown in FIG. 10. In this embodiment, the upper locking ring 170 is a flat circular ring having a downwardly depending circular tongue 172. As shown in FIG. 4, the tongue 172 is sized and shaped to be received in the top grooves 117, 127 of the small mandrel segments 110, 120, and the aligned top grooves 137, 147 of the large mandrel segments 130, 140 (not shown in FIG. 4). Accordingly, the tongue 172 locks the tops of the mandrel segments 110, 120, 130 and 140 in relation to one another. As shown in FIGS. 3A and 4, a locking key 190 can be inserted in the semi-circular grooves 119, 129, 139 and 149, and can be secured in place by a plurality of C-shaped clips 195. The locking key 190 can include a plurality of semi-circular key segments to facilitate placement of the key 190 in the grooves 119, 129, 139 and 149. The key 190 fixes the mid-sections of adjacent mandrel segments 110, 120, 130 and 140 in relationship to each another. The lower locking ring 180 is a flat circular ring that is sized to be inserted inside the lower flanges of the mandrel segments 110, 120, 130 and 140. Once so inserted, the lower locking ring 180 blocks radial inward movement of the lower flanges of the mandrel segments 110, 120, 130 and 140, thereby locking the bottoms of the mandrel segments 110, 120, 130 and 140 in relation to one another on the base plate 160.

Figure 8:
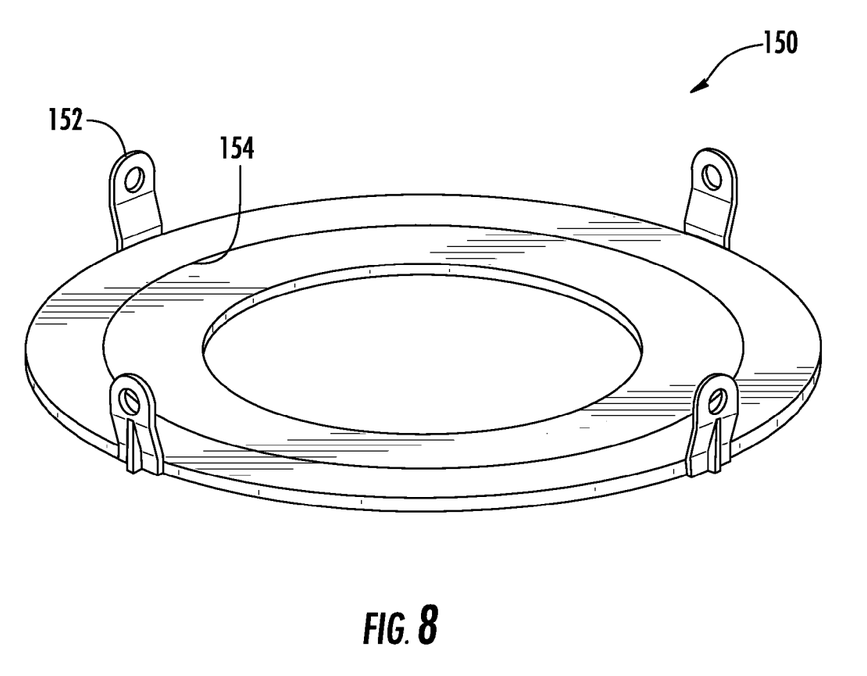
FIG. 8 is a perspective view of a lifting ring for use with the segmented mandrel assembly shown in FIGS. 3A-5.

As shown in FIGS. 3A and 4, the base plate 160 can sit atop a lifting plate 150. As shown in FIG. 8, the lifting plate 150 can include a circular lip 154 for concentrically aligning the base plate 160 on the lifting plate 150. The lifting plate 150 also can include a plurality of spaced lifting lugs 152 for use in lifting the assembled mandrel assembly 100 with lifting slings and the like.

Figure 2:
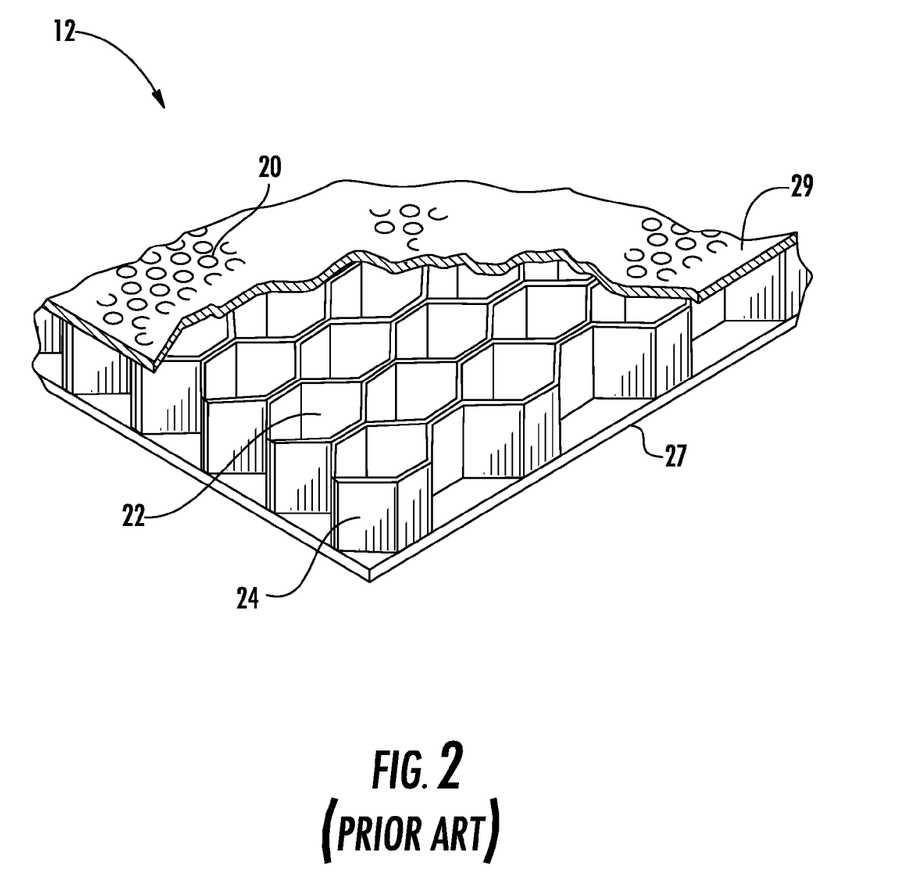
FIG. 2 is a cutaway perspective view of a typical noise-attenuating panel or shell of a modern aircraft engine structure.

FIG. 4 shows a cross-section of a shell 300 positioned about the contoured outer surface 115 of the inner mandrel assembly 100. As discussed above, the outer surface 115 of assembled inner mandrel 100 defines a desired interior contour of the shell 300. The shell 300 includes at least two layers of metallic materials and a bonding alloy disposed between those portions of the metallic layers that are to be bonded together. For example, the shell 300 can include a titanium inner skin 29, a titanium honeycomb core 24, and a titanium outer skin 27 similar to the shell portion 12 shown in FIG. 2. In the embodiment shown in FIG. 2, the inner face skin 29 includes a plurality of spaced perforations 20 that are in acoustic communication with the open cells 22 of the underlying honeycomb core 24. Such a configuration is known to dissipate or attenuate sound energy that is incident upon the inner face skin 29. As shown in FIGS. 3A and 4, the shell 300 and its component materials can be vertically supported on a plurality of circumferentially spaced riser blocks 210 positioned around the bases of the mandrel segments 110, 120, 130 and 140 before, during, and after the component materials are high temperature bonded together about the inner mandrel assembly 100. In the embodiment shown in FIG. 4, the material of the inner mandrel assembly 100 can be selected such that the material has a coefficient of thermal expansion that is greater than the coefficient of thermal expansion of the layered component shell materials 300.

Figure 11:
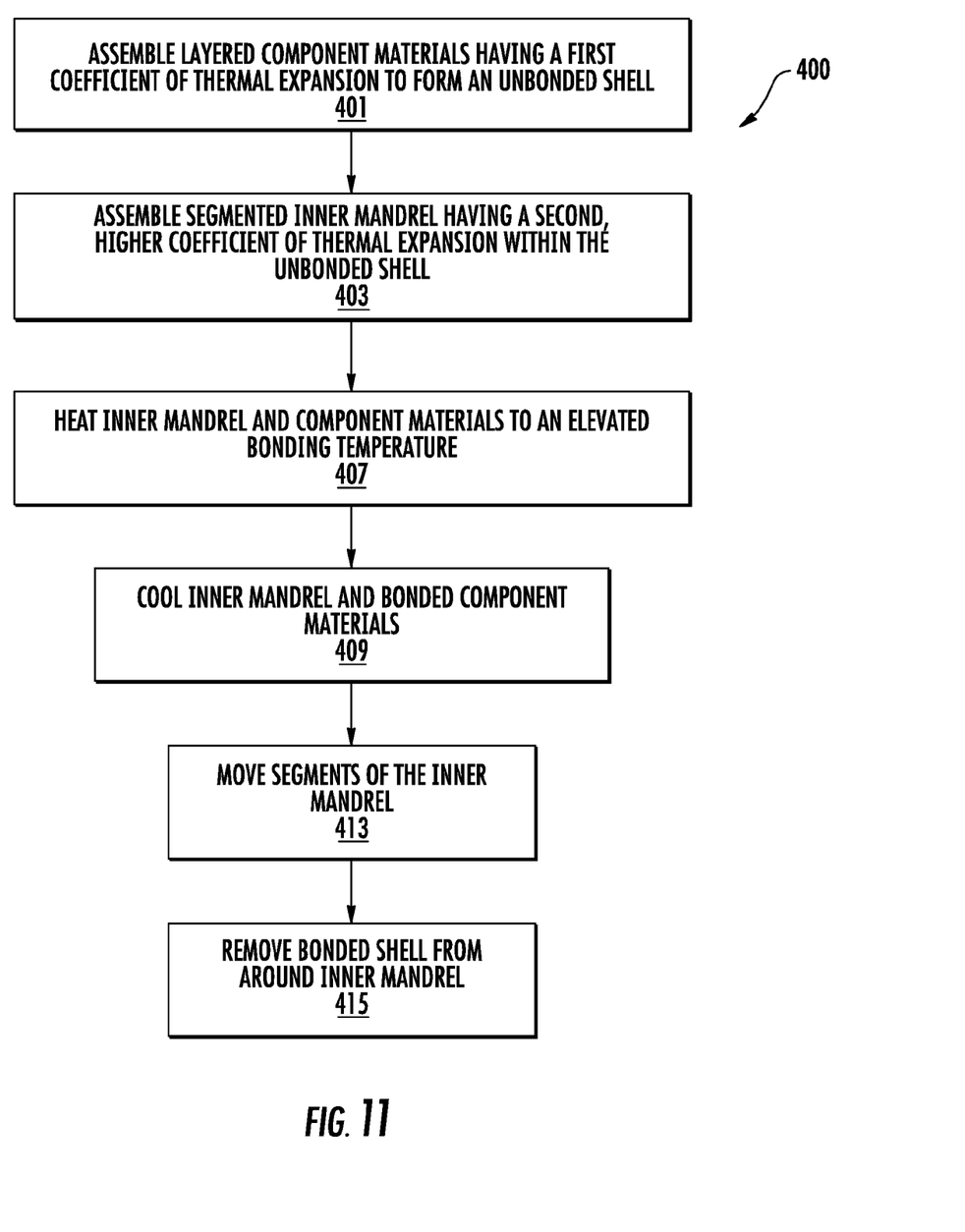
FIG. 11 is a flow chart showing a method of using a segmented inner mandrel like that shown in FIGS. 3A-10 to bond layered components of a metallic shell having complex curvatures.

One embodiment of a method 400 of using a segmented inner mandrel assembly 100 like that described above to bond an axisymmetric shell 300 having complex curvatures and comprising a plurality of layered metallic component materials by the delta-alpha high temperature bonding process is shown in the flow chart of FIG. 11. In step 401, the layers of metallic component materials forming the shell are assembled to form an unbonded shell 300. The unbonded shell 300 has a shape that substantially coincides with the shape of the outer surface 115 of the mandrel assembly 100. In step 403, the mandrel segments 110, 120, 130 and 140 of a hollow segmented inner mandrel 100 like that shown in FIGS. 3A-4 are assembled and locked together. As shown in FIG. 4, the lower edges of the component layers of the unbonded shell 300 can be vertically supported by a plurality of spaced riser blocks 210.

In step 407, the inner mandrel 100 and the layered component shell materials 300 are substantially uniformly heated to an elevated bonding temperature. If desired, a thermal shield can be placed around the shell 300 during heating in order to prevent the shell 300 from being heated too rapidly relative to the mandrel assembly 100. When bonding titanium materials, for example, the shell 300 and mandrel 100 can be heated to an elevated temperature of about 1,700 degrees Fahrenheit for about 30-120 minutes. As shown in FIGS. 3A and 4, one or more filler plates 200 can be added to the inner mandrel assembly 100 in order to add additional thermal mass to the assembly, and to facilitate substantially uniform heating of the components. For example, the filler plate 200 can be provided to shield the base plate 160 and thereby reduce the heating rate of the relatively thin base plate 160. Because the inner mandrel segments 110, 120, 130 and 140 have a greater coefficient of thermal expansion than the layered component shell materials 300, the layered component shell materials 300 are circumferentially stretched by the mandrel segments 110, 120, 130 and 140 when heated, and the layered component shell materials 300 are radially pressed together by the differential thermal expansion of the inner mandrel 100. Once the mandrel assembly 100 and shell 300 attain an elevated bonding temperature for a sufficient period of time, the bonding alloy disposed between the layers of the shell 300 fuses the shell components together at and along their points and lines of contact. In order to prevent unwanted oxidation of the shell 300 and the bond interfaces during heating, the heating can be done in a vacuum or in an inert atmosphere. For example, the inner mandrel assembly 100 and shell 300 can be heated to the elevated bonding temperature in a vacuum furnace.

Figure 5:
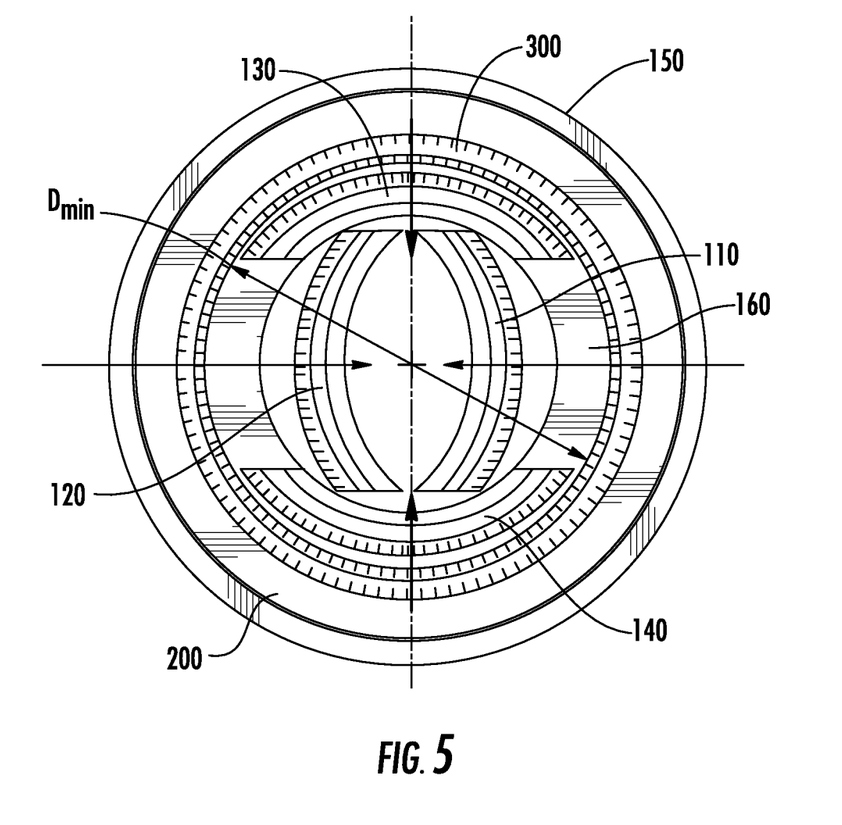
FIG. 5 is a plan view of the segmented mandrel shown in FIGS. 3A-4 showing the upper and lower locking rings, the locking key and locking clips removed, and the two small mandrel segments and the two large mandrel segments moved radially inward.

In step 409, the mandrel assembly 100 and shell 300 are slowly and substantially uniformly cooled to about room temperature. As the inner mandrel 100 cools, the difference in the mandrels' coefficient of thermal expansion and the coefficient of thermal expansion of the shell 300 causes the bonded shell 300 to at least partially separate from the inner mandrel 100. As discussed above, a release agent can be applied between the mandrel 100 and the shell 300 to facilitate separation of the shell 300 from the mandrel 100. Once the mandrel 100 and shell 300 have cooled to about room temperature, the segments 110, 120, 130 and 140 of the inner mandrel assembly 100 can be collapsed or contracted 413 to permit the shell 300 to be removed from the inner mandrel 100. For example, using the embodiment of a segmented mandrel assembly 100 described above and as shown in FIG. 5, the upper locking ring 170, the clips 195 and locking key 190, and the lower locking ring 180 can be removed. Then, the two small mandrel segments 110, 120 can be moved away from the bonded shell 300. In the embodiment shown in FIG. 5, the small mandrel segments 110, 120 can be moved radially inwardly toward each other and toward the center of the base plate 160. If necessary, the small mandrel segments 110, 120 can be extracted from the mandrel assembly 100 through an open end of the bonded shell 300. Subsequently, the two large mandrel segments 130, 140 can be moved away from interior of the bonded shell. In the embodiment shown FIG. 5, the large mandrel segments 130, 140 can be moved radially inwardly toward each other and toward the center of the base plate 160 until all portions of the mandrel segments 110, 120, 130 and 140 lie within a minimum diameter $D_{min}$ of the bonded shell 300. In a final step 415, the bonded shell 300 can be removed from the collapsed inner mandrel assembly 100.

Accordingly, the tools and methods described above permit a shell 300 having complex curvatures to be constructed in a single piece, thereby eliminating the need for joining separately formed shell sections together along at least one circumferential girth seam by welding or with connecting hardware. Accordingly, a one-piece shell normally will have a lower weight than a similar two-piece shell. Furthermore, the elimination of connecting hardware reduces the overall part count and weight of the shell. In addition, a one-piece shell can be produced more efficiently and in less time than a multi-segment shell. Furthermore, if the shell is to include acoustic treatment like that shown in FIG. 2, the one-piece shell maximizes the surface area available for such acoustic treatment The embodiments of the invention described above are intended to illustrate and enable various aspects and features of the invention, and are not intended to limit the invention thereto. Persons of ordinary skill in the art will recognize that various changes and modifications can be made to the described embodiments without departing from the invention. For example, though the segmented inner mandrel assembly has been described above as including four separable mandrel segments, the segmented inner mandrel may include more or fewer than four segments. In addition, though the segmented inner mandrel assembly has been described as having a substantially convex outer surface, the mandrel can alternatively include a substantially concave outer surface, or an outer surface that includes a combination of at least one substantially convex portion and at least one substantially concave portion. All such variations are intended to be within the scope of the appended claims.

What is claimed is:

1. A method of bonding a plurality of layered component materials to form an axisymmetric composite shell by temperature bonding, the composite shell including an exterior surface and an interior surface having complex curvature, the method comprising:

(a) assembling the layered component materials to form an unbonded shell assembly, the component materials having a first coefficient of thermal expansion;

(b) after assembling the layered component materials to form an unbonded shell assembly, assembling a segmented inner mandrel within the unbonded shell assembly, the inner mandrel having a lower end and an upper end and comprising a plurality of segments, each segment configured to be moved between a radially outward position in which each segment is joined to two adjacent segments to form an assembled inner mandrel and a radially inward position in which each segment is separated from its two adjacent segments, each segment having a second coefficient of thermal expansion that is less than the first coefficient of thermal expansion, the assembled inner mandrel having at least one substantially continuous outer surface having complex curvature that substantially corresponds in shape to at least a portion of the interior surface of the composite shell;

(c) heating the inner mandrel and the unbonded shell assembly to an elevated temperature, thereby substantially compressing together the layered component materials constituting the unbonded shell assembly to form the axisymmetric composite shell;

(d) moving two circumferentially spaced apart segments of the inner mandrel in the radially inward direction and away from the axisymmetric composite shell; and (e) then moving at least one other segment of the inner mandrel in the radially inward direction and away from the axisymmetric composite shell.

2. The method according to claim 1, wherein:
the two circumferentially spaced apart segments moved in step (d) are moved further in the radially inward direction than the at least one other segment moved in step (e).

3. The method according to claim 1, wherein:
the plurality of segments includes first second, third and fourth segments with the third and fourth segments being circumferentially spaced apart from one another by the first and second segments;
and the method comprises:
moving the third and fourth segments in the radially inward direction without substantial obstruction by the first and second segments which remain in position, and
after moving the third and fourth segments, moving the first and second segments in the inward direction independent of the third and fourth segments.

4. The method according to claim 3, wherein:
the first and second segments are substantially mirror images of each other; and
the third and fourth segments are substantially mirror images of each other;
and the method comprises:
locating the fourth segment between the first and second segments and opposite the third segment, in the assembled inner mandrel.

5. The method according to claim 4, wherein the first and second segments each comprise a substantially larger portion of the substantially axisymmetric body than either the third segment or the fourth segment.

6. The method according to claim 1, comprising:
providing a lower support to support the plurality of segments in substantially edge-to-edge relation at the lower end of the inner mandrel; and
providing an upper support to support the plurality of segments in substantially edge-to-edge relation at the upper end of the inner mandrel.

7. The method according to claim 1, wherein:
assembling the inner mandrel comprises locking the plurality of segments in relation to one another in the assembled inner mandrel to form the at least one substantially continuous outer surface.

8. The method according to claim 1, comprising:
placing a thermal shield around the unbonded shell assembly shell during heating in order to prevent the shell from being heated too rapidly relative to the inner mandrel.

9. The method according to claim 1, comprising:
prior to heating, adding one or more filler plates to a base plate on which the inner mandrel rests to thereby reduce a heating rate of the base plate.

10. The method according to claim 1, wherein heating the inner mandrel and the unbonded shell assembly to an elevated temperature includes heating in a vacuum.

11. The method according to claim 1, wherein heating the inner mandrel and the unbonded shell assembly to an elevated temperature includes heating in an inert atmosphere.

12. The method according to claim 1, wherein at least one of the component materials includes at least one sheet of cellular core material.

13. The method according to claim 1, comprising:
prior to heating, disposing a bonding alloy between one or more layers of the component materials constituting the unbonded shell assembly.

14. The method according to claim 1, comprising:
heating the unbonded shell assembly and the inner mandrel to an elevated temperature of about 1,700 degrees Fahrenheit for about 30-120 minutes.

15. The method according to claim 1, wherein:
the layered component materials of the unbonded shell assembly include an inner skin, a honeycomb core, and an outer skin;
and the method comprises:
prior to heating, disposing a bonding alloy between the layered component materials; and
heating the unbonded shell assembly and the inner mandrel to an elevated temperature of about 1,700 degrees Fahrenheit for about 30-120 minutes.

16. The method according to claim 15, wherein:
the inner skin, the honeycomb core and the outer skin are all formed from titanium; and
the inner skin includes a plurality of spaced perforations that are in acoustic communication with open cells of the honeycomb core.

17. A method of bonding a plurality of layered component materials to form an axisymmetric composite shell by high temperature bonding, the composite shell including an exterior surface and an interior surface having complex curvature, the method comprising:

(a) assembling the layered component materials to form an unbonded shell assembly, the component materials having a first coefficient of thermal expansion;

(b) assembling a segmented inner mandrel within the unbonded shell assembly, the inner mandrel comprising a plurality of segments each having a second coefficient of thermal expansion that is less than the first coefficient of thermal expansion, the inner mandrel having at least one substantially continuous outer surface that substantially corresponds in shape to at least a portion of the interior surface of the composite shell;

(c) heating the inner mandrel and the assembled component materials to an elevated temperature, thereby substantially compressing the layered component materials together; and (d) moving the segments of the inner mandrel away from the shell to separate the shell from the inner mandrel.

18. The method according to claim 17, wherein the inner mandrel includes at least three segments, and wherein moving the segments includes moving at least one segment in a direction that is substantially toward a center of the inner mandrel.

19. The method according to claim 17, wherein at least one of the component materials includes at least one sheet of cellular core material.

20. The method according to claim 17, wherein heating the inner mandrel and the assembled component materials to an elevated temperature includes heating in a vacuum.

* * * * *